United States Patent [19]
Panth

[11] Patent Number: 5,954,249
[45] Date of Patent: Sep. 21, 1999

[54] DEVICE FOR A CLEARING SAW HARNESS

[75] Inventor: Erik Olof Panth, Östhammar, Sweden

[73] Assignee: Panth-Produkter AB, Osthammar, Sweden

[21] Appl. No.: 08/433,378

[22] PCT Filed: Oct. 29, 1993

[86] PCT No.: PCT/SE93/00905

§ 371 Date: Apr. 28, 1995

§ 102(e) Date: Apr. 28, 1995

[87] PCT Pub. No.: WO94/09674

PCT Pub. Date: May 11, 1994

[30] Foreign Application Priority Data

Oct. 29, 1992 [SE] Sweden ................................. 9203198

[51] Int. Cl.$^6$ ....................................................... A45F 5/14
[52] U.S. Cl. ........................... 224/234; 224/257; 224/268
[58] Field of Search ................................... 224/234, 260, 224/257, 268, 195, 203, 220, 224, 226

[56] References Cited

U.S. PATENT DOCUMENTS

| 3,318,499 | 5/1967 | Kallio ...................................... 224/234 |
| 3,343,735 | 9/1967 | Breeding et al. ........................ 224/226 |
| 4,776,504 | 10/1988 | Panth ...................................... 224/209 |

FOREIGN PATENT DOCUMENTS

| 366469 | 4/1974 | Sweden . |
| 373272 | 2/1975 | Sweden . |
| 458820 | 5/1989 | Sweden . |
| 8903644 | 5/1991 | Sweden . |

Primary Examiner—David J. Walczak
Attorney, Agent, or Firm—Hodgson, Russ, Andrews, Woods & Goodyear, LLP

[57] ABSTRACT

A clearing saw harness device comprising a pad, to which the clearing saw is detachably attachable, for bearing against a person's body, a harness for the pad, and a helical spring for attaching the pad to the harness for at least partially absorbing forces transmitted from the clearing saw. The pad comprises two flexible plate elements which are formed and interconnected to each other along opposed edge portions respectively thereof so that one of the plate elements is substantially planar and an other is curved. The harness includes a band which passes through a ring and both of a pair of slots in the pad. An end portion of the spring is attached to the ring and an other end portion of the spring is attached to the pad.

16 Claims, 2 Drawing Sheets

DEVICE FOR A CLEARING SAW HARNESS

TECHNICAL FIELD

The present invention relates to a device for a clearing saw harness worn by a person such that the weight of a clearing saw detachably mounted to the harness and operated by said person will be transmitted to the body of said person, the harness being connected with, on one hand, a pad which is intended to bear against the hip or thigh of the person and to absorb compressive and torsional forces transmitted to the person from the clearing saw and, on the other hand, an attachment means which is disposed adjacent to the pad, to which attachment means the clearing saw is intended to be detachably connected.

PRIOR ART

Devices of the above-mentioned kind are previously known from the Swedish patent application as published for opposition 458 820 and the Swedish registered design 16228.

While these devices are satisfactory in most ways, vibrations and bumps spread from the clearing saw to the person wearing the harness, causing inconvenience or discomfort. Vibrations and bumps spread to the user's hands and arms are particularly troublesome and might even cause permanent damage when the clearing work is of long duration. Further, heavy bumps caused by, for instance, the clearing saw striking against objects of some size or by the user moving rapidly may bring the clearing saw out of engagement with the attachment means usually formed as a hook, which might have serious consequences and could cause the harness to be exposed to instantaneous stresses transmitted as blows to the shoulders of the user.

A device of the above-mentioned kind is also known from the Swedish patent application 8903644-6. However, it includes a resilient element which is attached to the pad and carries the attachment means (the hook). To some extent, said element solves the problem arising in the use of the two devices described above as regards transmission of blows, bumps and vibrations from the clearing saw to the user, but the device has certain disadvantages. The resilient element is a rubber plate whose resilience properties are such that, to a certain degree, it will stretch when a clearing saw is attached to the hook but is unable to stretch further to any great extent when the saw is rapidly removed from the plate. Further, the hook is attached to the rubber plate in such a way that, should the rubber plate break, the saw might accidentally be removed (might fall) from the pad, so that the user might be seriously injured. Further, the rubber plate is not protected against damage.

Also, the above described known devices have in common that their pads are expensive to manufacture and that they do not bear comfortably against the user which is mainly due to the parts bearing against the user not being sufficiently yielding.

SUMMARY OF THE INVENTION

It is an object of the present invention to improve previously known devices in the above described respects and to provide a device which is reliable and comfortable as well as easy and non-expensive to mount.

This object is achieved by the device according to the invention presenting the features stated in the characterizing portions of the claims.

PREFERRED EMBODIMENT

Figure 1:
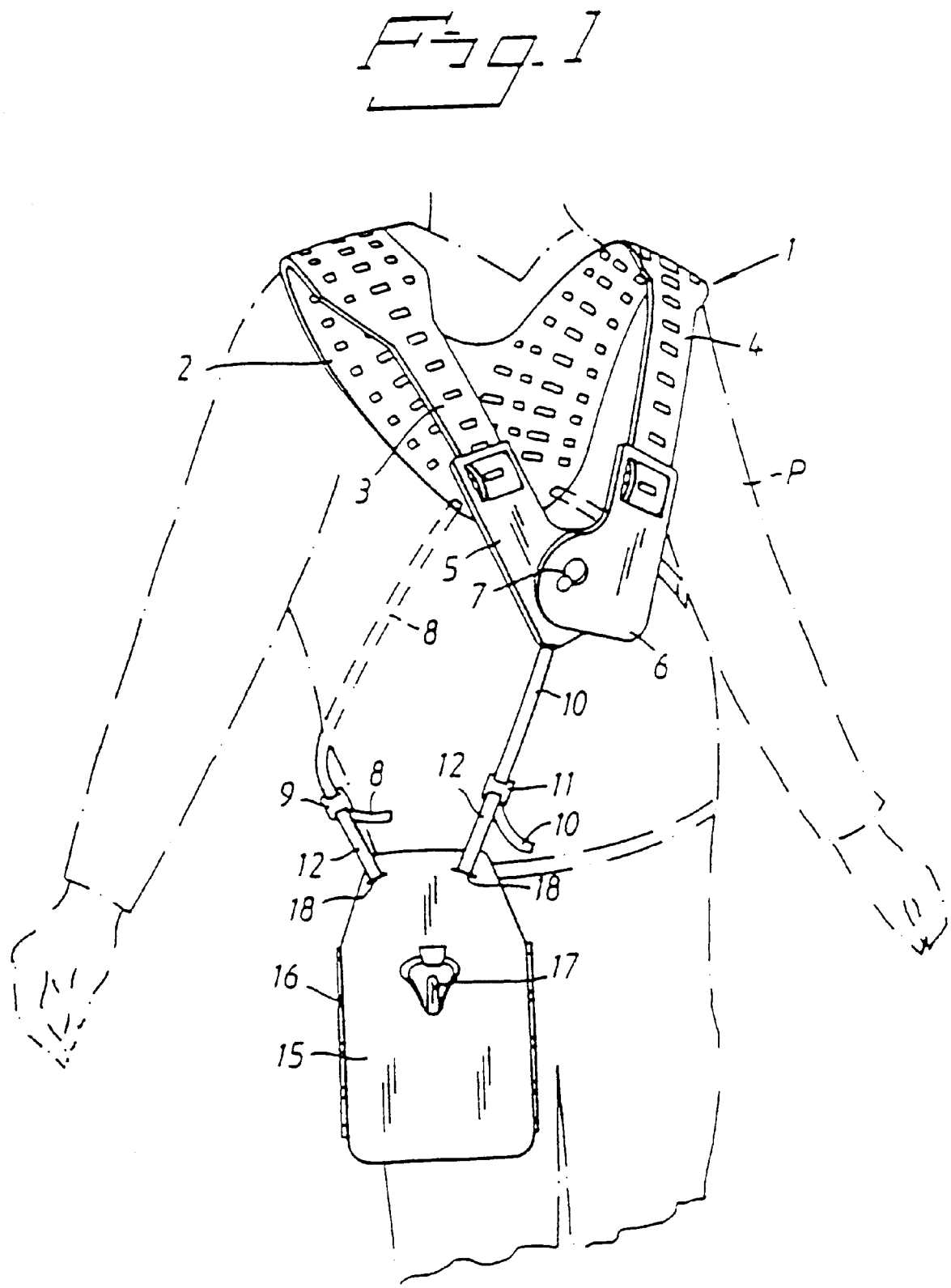
FIG. 1 is a perspective view of a clearing saw harness provided with a device according to the invention.

A clearing saw harness, generally indicated at 1, is worn by a person P. The harness 1 includes a V-shaped portion 2 bearing against the person's back, and elongated parts 3 and 4 which are integral with said portion and which bear against the shoulders and chest of the user. At the free ends of the parts 3, 4, plates 5 and 6 are detachably and adjustably attached. The plates 5 and 6 are detachably interconnected at 7. The details 2–7 are formed of a flexible plastic material.

A first flexible band 8 is attached to portion 2, the band partially extending around the body of the user for fixing in a connection lock 9. A second flexible band 10 is fixed at one end to the plate 5 and at the other end in a connection lock 11. The connection locks 9 and 11 may be acted on such as to extend or shorten the bands 8 and 10 between their mounting points whereupon they can be locked to the same.

The connection locks 9 and 11 are attached to a short band 12 passing through a steel ring 13. The ring 13 is connected with one end of a helical spring 14. The other end of the spring 14 is attached to a projection 19 protruding from a plate 15 which is also provided with two slots 18 through which the band 12 is passed.

The plate 15 which is made of a flexible plastic material is planar in the unmounted condition but will bend when a lattice 16 is mounted to the same. On the outside of the plate, as shown in FIG. 1, an attachment means in the form of a hook 17 is disposed. The hook 17 is immovably mounted to the plate 15 whereby changing of the distance between them is prevented. This means that the saw can never protrude under the plate and thereby injure the user's thighs.

The plate 15 and the lattice 16 form a so called pad whose inner side is intended to bear against the person's P hip or thigh and to absorb torsional and compressive forces from a clearing saw (not shown) suspended from the hook.

Figure 2:
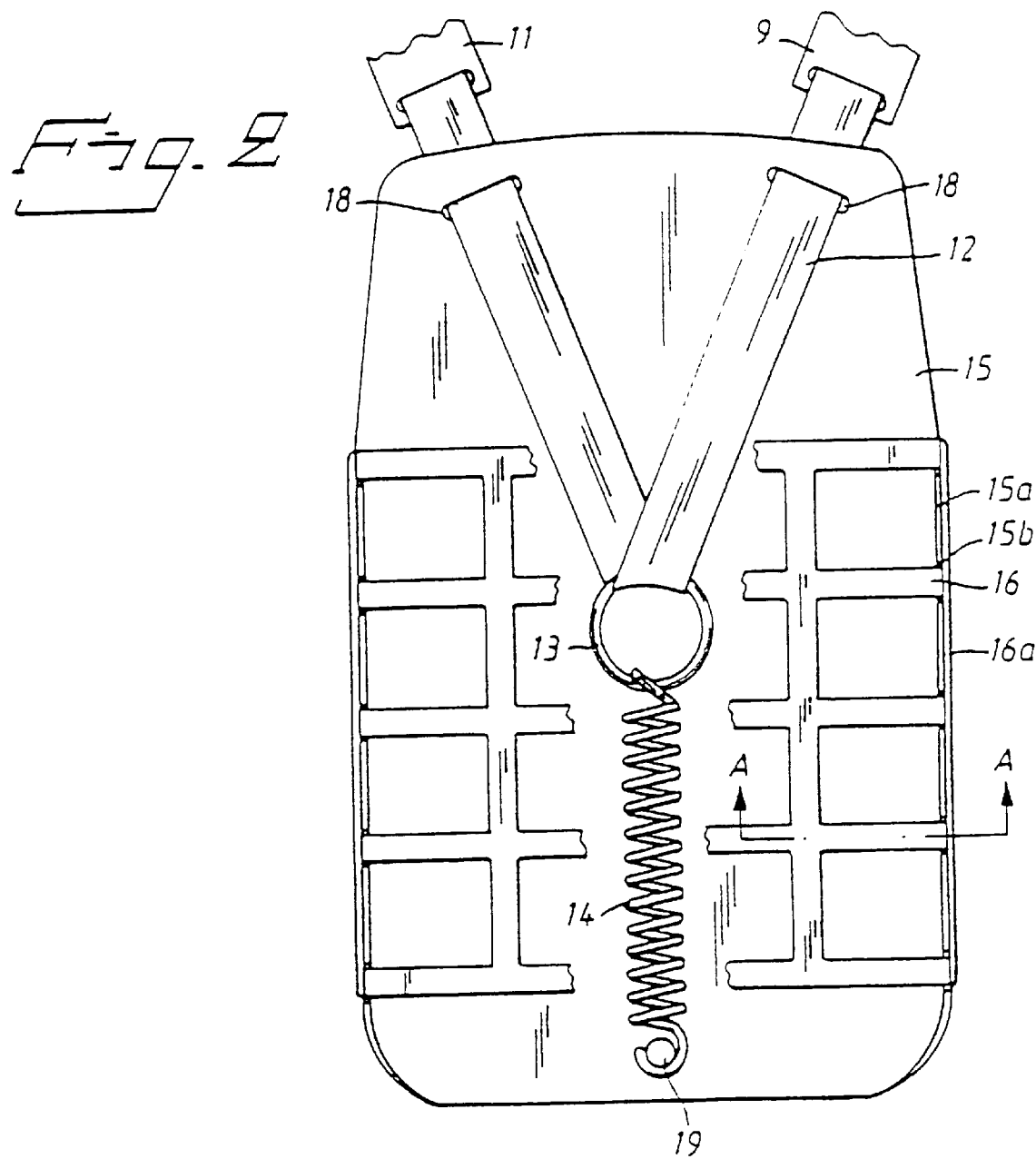
FIG. 2 is a partly cut view of the device in FIG. 1, seen from the rear.
Figure 3:
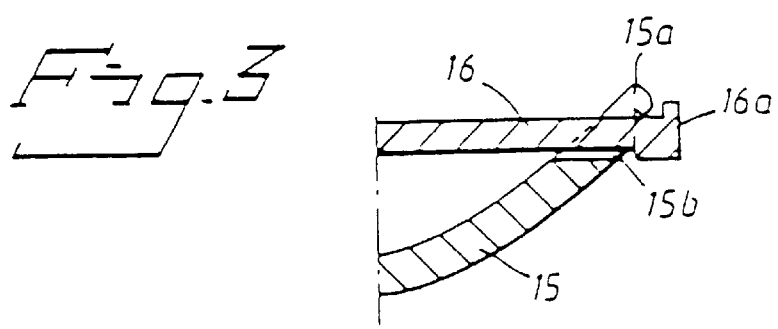
FIG. 3 is a section along the line A—A in FIG. 2.

The lattice 16, which is also made of a flexible plastic material, is planar both in the unmounted condition and in the mounted condition. It is fastened to the plate 15 by first bending the latter along its vertical axis as shown in FIGS. 1 and 2 and curving it sufficiently for the opposed vertical frame portions 16a of the lattice 16 thereafter to be brought over the opposed vertical side edges 15a of the plate 15 and for the equally wide horizontal beads forming parts of the lattice to be brought into recesses 15b in the side edges 15a, the width of the recesses slightly exceeding that of the beads.

Assembly of the plate 15 and the lattice 16 is carried out after mounting of the spring 14, the ring 13, and the band 12 onto the plate 15, and after assembly the details 12–14 will be located between the curved plate and the planar lattice where they are protected and are not prevented from filling their function.

Since the plate 15 is curved in the mounted condition, it is also stable. Further, by the plate exerting a tensile stress in the lattice 16 it is ensured that the lattice will continue to engage the plate (at 15a, 16a) while being sufficiently yielding and able to absorb the vibrations and blows transmitted in a substantially horizontal direction from the clearing saw to the user.

Essentially vertical bumps, blows and vibrations will be absorbed by the spring 14. With a clearing saw suspended from the hook 17, the spring is somewhat stretched, and therefore upward and downward forces from the bumps etc will be absorbed at least partly by the spring such that they will not be transmitted, or will be transmitted with reduced effect, to the user via the harness.

Should the spring 14 break during the clearing operation, this will not cause the saw to be removed from the pad 15, 16 since the ring 13 cannot pass the slots 18 in the plate 15 through which the band 12 passes.

While only one embodiment of the present invention has been described above and shown in the drawings, it will be understood that the invention is not limited to said embodiment but is only limited by what is stated in the claims.

I claim:

1. A clearing saw harness device comprising a pad for bearing against a person's body, a harness for said pad, means for detachably attaching a clearing saw to said pad, and means comprising a spring for attaching said pad to said harness for at least partially absorbing forces transmitted from the clearing saw, wherein said pad comprises two flexible plate elements which are formed and interconnected to each other along opposed edge portions respectively of each of said plate elements so that one of said plate elements is substantially planar and an other of said plate elements is curved, and wherein at least one of said plate elements is formed as a lattice.

2. A device according to claim 1 wherein said pad includes a pair of slot means, and said harness includes a band which passes through both of said slot means and to which an end portion of said spring is attached, an other end portion of said spring being attached to said pad.

3. A device according to claim 1 wherein said spring is disposed between said plate elements.

4. A device according to claim 1 wherein one of said plate elements of said pad includes a pair of slot means, and said harness includes a band which passes through both of said slot means and to which an end portion of said spring is attached, an other end portion of said spring being attached to said pad.

5. A device according to claim 4 wherein said spring is disposed between said plate elements.

6. A clearing saw harness device comprising a pad for bearing against a person's body, a harness for said pad, means for detachably attaching a clearing saw to said pad, and means comprising a spring for attaching said pad to said harness for at least partially absorbing forces transmitted from the clearing saw, wherein said pad comprises two flexible plate elements which are formed and interconnected to each other along opposed edge portions respectively of each of said plate elements so that one of said plate elements is substantially planar and an other of said plate elements is curved, and wherein said pad includes slot means, said harness including a band which passes through said slot means, the device further comprising a ring through which said band also passes, and said spring is formed as a helical spring and has an end portion which is attached to said ring.

7. A device according to claim 6 wherein said spring is disposed between said plate elements.

8. A clearing saw harness device comprising a pad for bearing against a person's body, a harness for said pad, means for detachably attaching a clearing saw to said pad, said pad comprising two flexible plate elements which are formed and interconnected to each other along opposed edge portions respectively of each of said plate elements so that one of said plate elements is substantially planar and an other of said plate elements is curved, and wherein at least one of said plate elements is formed as a lattice.

9. A device according to claim 8 further comprising a spring disposed between said plate elements and connecting said pad to said harness.

10. A device according to claim 8 wherein one of said plate elements has a pair of beads along the opposed edge portions thereof respectively, and an other of said plate elements has means defining a pair of recesses along the opposed edge portions thereof respectively for lockingly receiving said beads respectively.

11. A device according to claim 10 wherein said beads and said recess means are formed integrally with said plate elements respectively.

12. A device according to claim 11, further comprising a spring disposed between said plate elements and connecting said pad to said harness.

13. A clearing saw harness device comprising a pad for bearing against a person's body, a harness for said pad, means for detachably attaching a clearing saw to said pad, and means comprising a spring for attaching said pad to said harness for at least partially absorbing forces transmitted from the clearing saw, said pad includes a pair of slot means, and said harness includes a band which passes through both of said slot means and to which an end portion of said spring is attached, an other end portion of said spring being attached to said pad, the device further comprising a ring through which said band also passes, and said spring is formed as a helical spring, and wherein said an end portion of said spring is attached to said ring.

14. A device according to claim 13 wherein said pad comprises two flexible plate elements which are formed and interconnected to each other along opposed edge portions respectively of each of said plate elements so that one of said plate elements is substantially planar and an other of said plate elements is curved.

15. A device according to claim 14 wherein said spring is disposed between said plate elements.

16. A device according to claim 14 wherein at least one of said plate elements is formed as a lattice.

* * * * *